(No Model.)

J. F. JONES.
TOBACCO HANGER.

No. 417,869. Patented Dec. 24, 1889.

WITNESSES:
Fred G. Dieterich
Amos W. Hart

INVENTOR:
Jordan F. Jones.
BY
ATTORNEYS

UNITED STATES PATENT OFFICE.

JORDAN F. JONES, OF LAUREL, NORTH CAROLINA.

TOBACCO-HANGER.

SPECIFICATION forming part of Letters Patent No. 417,869, dated December 24, 1889.

Application filed September 30, 1889. Serial No. 325,630. (No model.)

*To all whom it may concern:*

Be it known that I, JORDAN F. JONES, of Laurel, in the county of Franklin and State of North Carolina, have invented a new and useful Improvement in Tobacco-Hangers, of which the following is a specification.

My invention is an improvement in that class of tobacco-hangers generally designated "tobacco-sticks," and consisting of a bar having sharpened teeth attached to its opposite sides, on which the tobacco-leaves are strung and held suspended when the said hanger is supported horizontally in the curing-house or on racks located in the field.

The details of construction and the novel features constituting the improvement are as hereinafter described.

Figure 1:
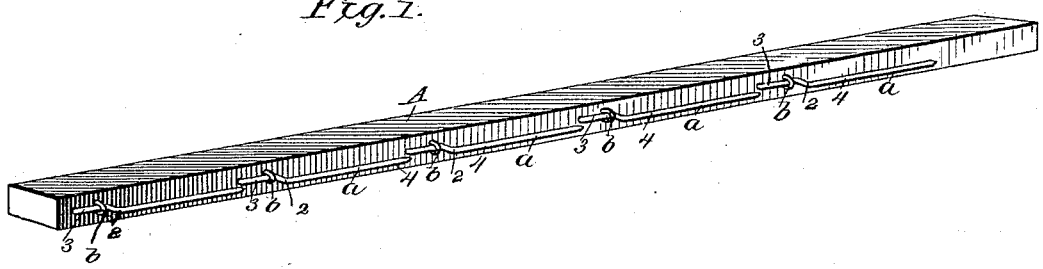
Figure 2:
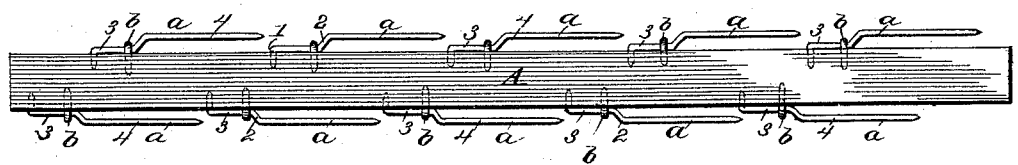
Figure 3:

In the accompanying drawings, Figure 1 is a perspective view of my invention. Fig. 2 is a plan view of the same. Fig. 3 is a plan view of one of the wire teeth detached.

The stick proper A is a flat rectangular wooden bar. The teeth $a$, for suspending the tobacco, are formed of pieces of stout wire and attached to the middle of the narrow sides of said stick, parallel therewith, and arranged with their sharpened free ends all pointing in the same direction. One end 1 of each tooth is bent at a right angle, and a short distance from said end 1 the tooth is bent at a sharp angle, thus forming an offset or shoulder 2, so that the two portions 3 and 4 of the tooth on opposite sides of such shoulder 2 lie in different but parallel planes. The teeth are attached to the bar A in the following manner: The aforesaid bent end 1 is inserted in a hole or socket in the bar and a wire staple $b$ is driven into the latter over the tooth at a point close to the shoulder or offset 2. Thus the shorter portion 3 of the tooth $a$ that lies between the bent end 1 and the offset 2 is clamped flat against the side of the bar A, while the longer free portion 4 is separated from it by a narrow space. By this means the teeth are rigidly secured, so that they cannot be moved in any direction.

It will be noted that the teeth on one side of the bar A are not arranged exactly opposite those on the other side, but in alternation, so that the free portions 3 of the teeth in one row are opposite, or nearly so, to the parts 4 of those in the other row. This arrangement affords the greatest available space for each leaf or bunch suspended from any tooth, and also the freest circulation of air between and among the several leaves or bunches. The width of the bar A being also greater than usual, the leaves or bunches of leaves are held farther apart than by the "sticks" in ordinary use.

The arrangement of all the teeth on both sides of the stick A with their points in the same direction enables the tobacco-leaves to be detached from both sides simultaneously and with the utmost celerity.

The sticks will ordinarily be sold complete with the teeth attached, but the latter may be manufactured and sold separately, to be applied by tobacco-growers or others to sticks made by themselves.

What I claim is—

1. The combination, with the stick proper A, having sockets, as specified, of a series of wire teeth $a$, each having the right-angular end 1 and offset 2, and a staple applied, as shown, for clamping the portion 3, that intervenes said end and offset, against the side of the stick, the free portions 4 of the teeth being separated from the stick by a narrow space, as shown and described.

2. An improved tooth for tobacco-hangers, the same consisting of a wire or rod having one end 1 bent at a right angle and an offset 2, the portions 3 and 4 on opposite sides of said offset being in different but parallel planes, as shown and described.

JORDAN F. JONES.

Witnesses:
  GEO. H. COOPER,
  WM. K. U. WILLIAMS, Jr.